(12) United States Patent
Tsirkin et al.

(10) Patent No.: US 9,904,564 B2
(45) Date of Patent: Feb. 27, 2018

(54) POLICY ENFORCEMENT BY HYPERVISOR PARAVIRTUALIZED RING COPYING

(75) Inventors: Michael S. Tsirkin, Yokneam Yillit (IL); Avi Kivity, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 123 days.

(21) Appl. No.: 13/296,422

(22) Filed: Nov. 15, 2011

(65) Prior Publication Data
US 2013/0125115 A1    May 16, 2013

(51) Int. Cl.
*G06F 9/455* (2006.01)
*G06F 11/30* (2006.01)

(52) U.S. Cl.
CPC ........ *G06F 9/45558* (2013.01); *G06F 9/4555* (2013.01); *G06F 11/301* (2013.01); *G06F 11/3072* (2013.01); *G06F 2009/45583* (2013.01)

(58) Field of Classification Search
CPC .................................................. G06F 9/45533
USPC ............................................................. 718/1
See application file for complete search history.

(56) References Cited

U.S. PATENT DOCUMENTS

| | | | | |
|---|---|---|---|---|
| 2003/0009692 A1* | 1/2003 | Smith et al. | .................. | 713/201 |
| 2004/0093521 A1* | 5/2004 | Hamadeh | ................ | H04L 29/06 726/22 |
| 2006/0248229 A1* | 11/2006 | Saunderson | ........ | H04L 12/4641 709/245 |
| 2006/0288418 A1* | 12/2006 | Yang | ..................... | H04L 63/145 726/24 |
| 2007/0089111 A1* | 4/2007 | Robinson et al. | ................. | 718/1 |
| 2007/0300241 A1* | 12/2007 | Prakash et al. | ................ | 719/321 |
| 2008/0086726 A1* | 4/2008 | Griffith et al. | .................... | 718/1 |
| 2008/0298376 A1* | 12/2008 | Takeda | ............... | H04L 12/2697 370/400 |
| 2009/0113425 A1* | 4/2009 | Ports et al. | ........................ | 718/1 |
| 2010/0274876 A1* | 10/2010 | Kagan et al. | ................. | 709/221 |
| 2011/0072426 A1* | 3/2011 | Huang | .................... | G06F 9/544 718/1 |
| 2012/0011397 A1* | 1/2012 | Murakami et al. | ............. | 714/15 |
| 2012/0179874 A1* | 7/2012 | Chang et al. | ................. | 711/128 |
| 2012/0303808 A1* | 11/2012 | Xie | ..................... | H04L 61/1511 709/225 |
| 2012/0311573 A1* | 12/2012 | Govindaraju et al. | ............ | 718/1 |
| 2012/0324536 A1* | 12/2012 | McDysan | .......................... | 726/3 |
| 2012/0331464 A1* | 12/2012 | Saito et al. | ....................... | 718/1 |

OTHER PUBLICATIONS

Andrew Tanenbaum, Modern Operating System, 3rd Edition, 2008, Pearson Education, Inc.*

(Continued)

*Primary Examiner* — Charlie Sun
(74) *Attorney, Agent, or Firm* — Lowenstein Sandler LLP

(57) ABSTRACT

Methods and systems for executing a request between a virtual machine and a paravirtualized machine are provided. The request is received from the virtual machine at a first shared memory of a hypervisor. The first shared memory is accessible to the virtual machine but not the paravirtualized machine. The request is transferred by the hypervisor from the first shared memory to a second shared memory of the hypervisor. The second shared memory is accessible to the paravirtualized machine but not the virtual machine. The request is intended for execution by the paravirtualized machine.

23 Claims, 4 Drawing Sheets

(56) References Cited

OTHER PUBLICATIONS

Andrew S. Tanenbaum, Modern Operating Systems, 3rd edition, 2008.*
Handling IRPs: What Every Driver Writer Needs to Know, 2006.*
Bosch, Virtualization, 2010.*
Port, Wikipedia, retrieved Feb. 21, 2016.*
Tanenbaum, Andrew, Modern Operating Systems, $3^{rd}$ Edition, Pearson Prentice Hall, 2008, pp. 569.*
Handling IRPs: What Every Driver Writer Needs to Know, Microsoft, 2006. [retrieved Feb. 24, 2016]. Retrieved from the Internet< URL: https://www.cmlab.csie.ntu.edu.tw/~cathyp/eBooks/WindowsNT/Driver/IRPs.pdf>.*
Bosch, Greg, Virtualization, 2010. [retrieved Feb. 24, 2016]. Retrieved from the Internet< URL:http://www.cse.lehigh.edu/~brian/course/2010/sysadmin/notes/22-Virtualization.pdf>.*
Port, Wikipedia. [retrieved Feb. 21, 2016]. Retrieved from the Internet<URL: https://en.wikipedia.org/wiki/Port_(computer_networking)>.*

* cited by examiner

POLICY ENFORCEMENT BY HYPERVISOR PARAVIRTUALIZED RING COPYING

TECHNICAL FIELD

Embodiments of the present invention relate to a computer system, and more specifically, to a method and apparatus for executing a request between a virtual machine and a paravirtualized machine of a host operating system in a virtualized computing environment.

BACKGROUND

In order to provide a secure operating environment, the x86 architecture provides a mechanism for isolating user applications from the operating system using "privilege levels." In this model, a processor provides 4 privilege levels, also known as rings, which are arranged in a hierarchical fashion from ring 0 to ring 3. Ring 0 s the most privileged level with full access to the hardware and ability to call privileged instructions. The operating system runs in ring 0 with the operating system kernel controlling access to the underlying hardware. Rings 1, 2 and 3 operate at a lower privilege level and are prevented from executing instructions reserved for the operating system. In commonly deployed operating systems, user applications run in ring 3. Rings 1 and 2 historically have not been used by modern commercial operating systems. This architecture ensures that an application running in ring 3 that is compromised cannot make privileged system calls; however, a compromise in the operating system running in ring 0 hardware exposes applications running in the lower privileged levels.

The x86 architecture provides another mechanism called "virtualization" for isolating user applications from the operating system. Virtualization permits multiplexing of an underlying host machine between different virtual machines. The host machine allocates a certain amount of its resources to each of the virtual machines. Each virtual machine is then able to use the allocated resources to execute applications, including operating systems (referred to as guest operating systems (OS)). The software layer providing the virtualization is commonly referred to as a hypervisor and is also known as a virtual machine monitor (VMM), a kernel-based hypervisor, or a host operating system.

In a virtualized environment, the hypervisor runs at the most privileged ring level 0, controlling all hardware and system functions. The virtual machines run in a lower privileged ring, typically in ring 3. Since a guest operating system may have been originally designed to run directly on hardware, it expects to be running in ring 0 and may make privileged calls that are not permitted in ring 3. When the guest operating system makes these privileged calls, the hardware traps the instructions and issues a fault, which typically destroys the virtual machine.

An early attempt to overcome this problem was "emulation," in which guest operating system instructions of a virtualized x86 machine were fully translated from a guest format to a host format by the hypervisor. Unfortunately, emulation resulted in very poor performance. As a result, binary translation was developed. In this model, the hypervisor scans the virtual machine memory, intercepts privileged calls before they are executed, and dynamically rewrites the code in memory. The guest operating system is unaware of the change and operates normally. This combination of trap-and-execute and binary translation allows any x86 operating system to run unmodified upon the hypervisor.

A more recently developed technique is known as paravirtualization. In paravirtualization, the guest operating system running in the virtual machine is modified to replace all the privileged instruction calls with direct calls into the hypervisor. In this model, the modified guest operating system is aware that it is running on the hypervisor and can cooperate with the hypervisor for improved scheduling and I/O, removing the need to emulate hardware devices such as network cards and disk controllers.

In one implementation of paravirtualization, the hypervisor is responsible for core hypervisor activities such as CPU, memory virtualization, power management, and scheduling of virtual machines. The hypervisor loads a special privileged virtual machine called a paravirtualized machine that runs in domain 0. The paravirtualized machine has direct access to hardware and provides device drivers and I/O management for virtual machines.

Each virtual machine contains a modified kernel where CPU and memory accesses are handled directly by the hypervisor but I/O is directed to the paravirtualized machine. Requests for I/O are passed to a "back end" process in the paravirtualized machine which manages the I/O. In this model, the guest operating system runs in ring 1 while user space runs in ring 3.

With paravirtualized machines, the back end shares memory with the guest where requests are placed in the shared memory so that the hypervisor does not need to translate and execute requests. Unfortunately, since this shared memory resides in domain 0, both the virtual machine and the host machine are subject to compromise.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for executing a request between a virtual machine and a paravirtualized machine of a host operating system are described herein. In one embodiment, the request is received from the virtual machine at a first shared memory of a hypervisor. The first shared memory is accessible to the virtual machine but not the paravirtualized machine. The request is transferred by the hypervisor from the first shared memory to a second shared memory of the hypervisor. The second shared memory is accessible to the paravirtualized machine but not the virtual machine. The request is intended for execution by the paravirtualized machine.

In another embodiment, a request may be made between a device associated with a host operating system and a virtual machine of a guest operating system. The request from a paravirtualized machine originates from the device to the second shared memory of the hypervisor. The second shared memory is accessible to the paravirtualized machine but not the virtual machine. The request is transferred from the second shared memory to the first shared memory of the hypervisor. The first shared memory is accessible to the virtual machine but not the paravirtualized machine. The request is intended for execution by the virtual machine.

In one embodiment, the request is executed. In another embodiment, the request may be partially or wholly filtered or altered for security purposes. In one embodiment, the request may be monitored by the hypervisor. Monitoring may result in a notification sent to the guest operating system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
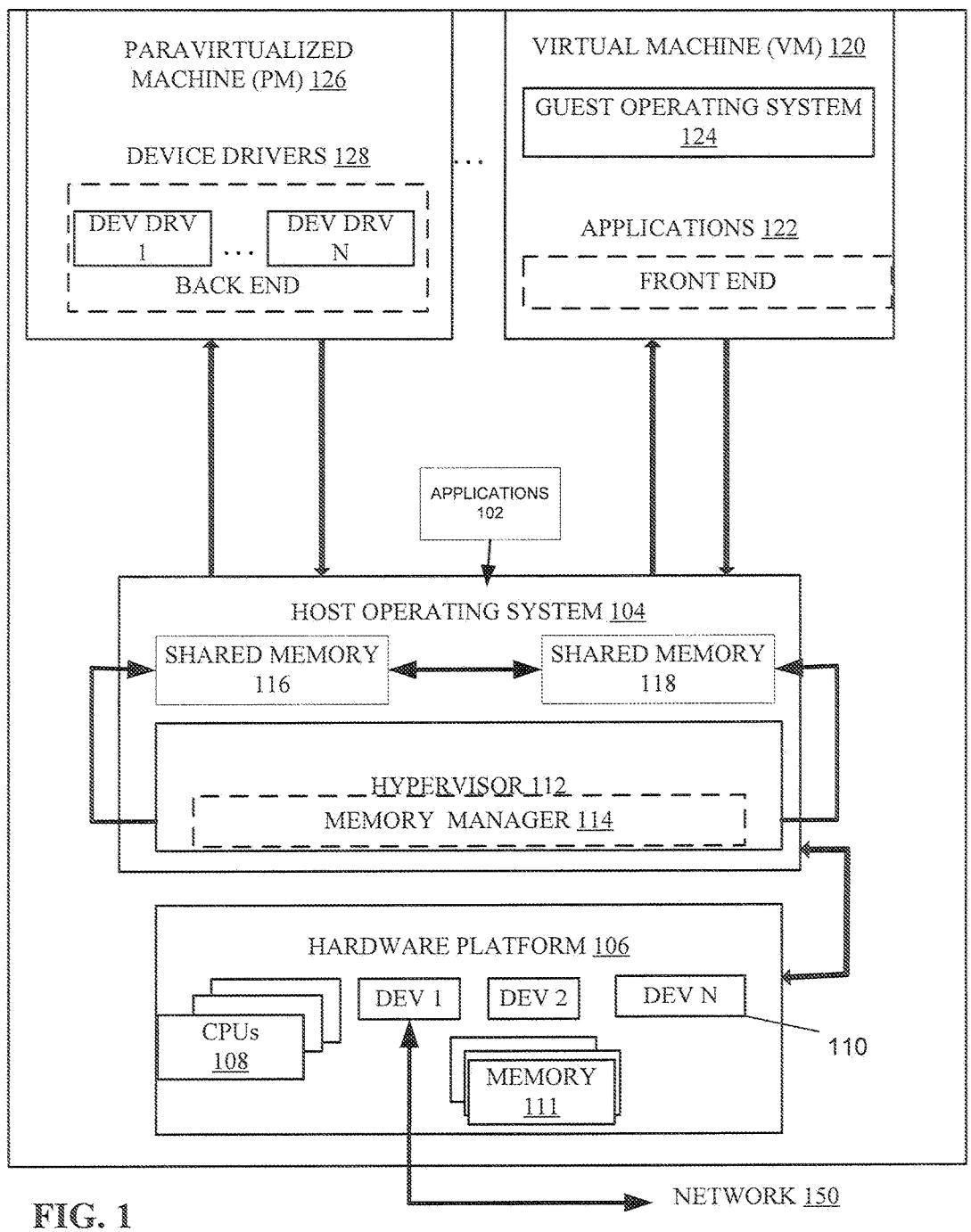
FIG. 1 is a block diagram of a computing system in which embodiments of the present invention may be implemented.

FIG. 1 is a block diagram illustrating one embodiment of a computer system 100, in which embodiments of the present invention may be implemented. The computer system 100 may be a host machine such as, for example, a server computer, a gateway computer, or any other suitable computer system that is configurable for operating as a host. The host machine (HM) 100 comprises an operating system 104 and a hardware platform 106. Operating system 104 may include Microsoft Windows®, Linux®, Solaris®, Mac® OS or any other suitable operating system for managing operations on the HM of computer system 100.

The hardware platform 106 may include one or more central processing units (CPUs) 108, devices 110, and memory 111. The devices 110 may be comprised of one or more hardware and software devices (DEV 1-DEV N), which may be located internally and externally to computer system 100. Examples of the devices 110 include network interface cards (NICs), sound or video adaptors, photo/video cameras, printer devices, keyboards, displays or any other suitable device intended to be coupled to a computer system. Examples of the memory 111 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

The HM 100 is also configured with one or more virtual machines (VMs) 120. VM 120 is a portion of software that, when executed on appropriate hardware, creates an environment that permits the virtualization of an actual physical computer system. Each of the VMs 120 may function as a self-contained platform, comprising one or more applications 122 and running a corresponding guest operating system 124. The guest operating system 124 in each of the VMs 120 may run the same or different operating systems. Similar to the operating system 104, the operating system 124 may include Microsoft Windows®, Linux®, Solaris®, Mac® OS or any other suitable operating system for managing operations associated with a virtualization environment.

A hypervisor 112, which emulates the underlying hardware platform 106 for the VMs 120, is provided and may run on the operating system 104 of the HM. A hypervisor is also known as a virtual machine monitor (VMM), a kernel-based hypervisor or a host operating system. The hypervisor 112 may support multiple VMs 120 residing on the HM of computer system 100. Alternatively, more than one hypervisor (not shown) may be provided to support multiple VMs 120 residing on the HM of computer system 100.

In an embodiment, the hypervisor 112 is configured at boot time to instantiate a special, privileged virtual machine called a paravirtualized machine 126 that runs in domain 0. The paravirtualized machine 126 has direct access to hardware and provides device drivers 128 (DEV DRV 1-DEV DRV N) in the back end for one or more of the VMs 120 to write or read the memory 111 or for one or more of the VMs 120 to receive a write or read request from the devices 110 of the host operating system 104.

In an embodiment, an application 122 running on the VM 120 may execute a request to read or write data to the memory 111 or to the one or more devices 110, or to receive messages from a network 150 via a device 110 (e.g., device "DEV 1" may be a network interface controller (NIC) or a network card such as an Ethernet network card). The network 150 may be a private network (e.g., a local area network (LAN), wide area network (WAN), intranet, etc.) or a public network (e.g., the Internet). In another embodiment, one or more applications 102 running on the operating system 104 of the HM (i.e., running outside a VM) 100 and/or one or more applications 122 running on one or more of the guest operating system 124 of the VMs 120 may receive messages from the network 150 via the device 110.

In an embodiment, to permit two-way communication between the VMs 120 in a user domain (e.g., domain 3) and the devices 110, the memory 111, or the network 150 in domain 0 while preventing unauthorized access to domain 0, the hypervisor 112 is provided with a shared memory 116 for exclusive use by the paravirtualized machine 126 and a shared memory 118 for exclusive use by the VM 120 under the control of memory manager 114.

In an embodiment, the hypervisor 116 writes a request from a VM 120 to the shared memory 118, copies the request to the shared memory 116, and then the hypervisor 112 transmits the request to the paravirtualized machine 126 where the request is carried out. In a reverse operation, a request from a device 110 (e.g., the network 150) is received by the hypervisor 112 of the paravirtualized machine 126. The hypervisor 112 writes the request to the shared memory 116, transfers the request to the shared memory 118, and the hypervisor 112 transmits the request to the VM 120 where the request is carried out. In an embodiment, when a transfer occurs between the shared memory 116 and the shared memory 118, the hypervisor 112 may filter or monitor transfers of packets to provide for security or maintenance operations to be discussed below.

Figure 2:
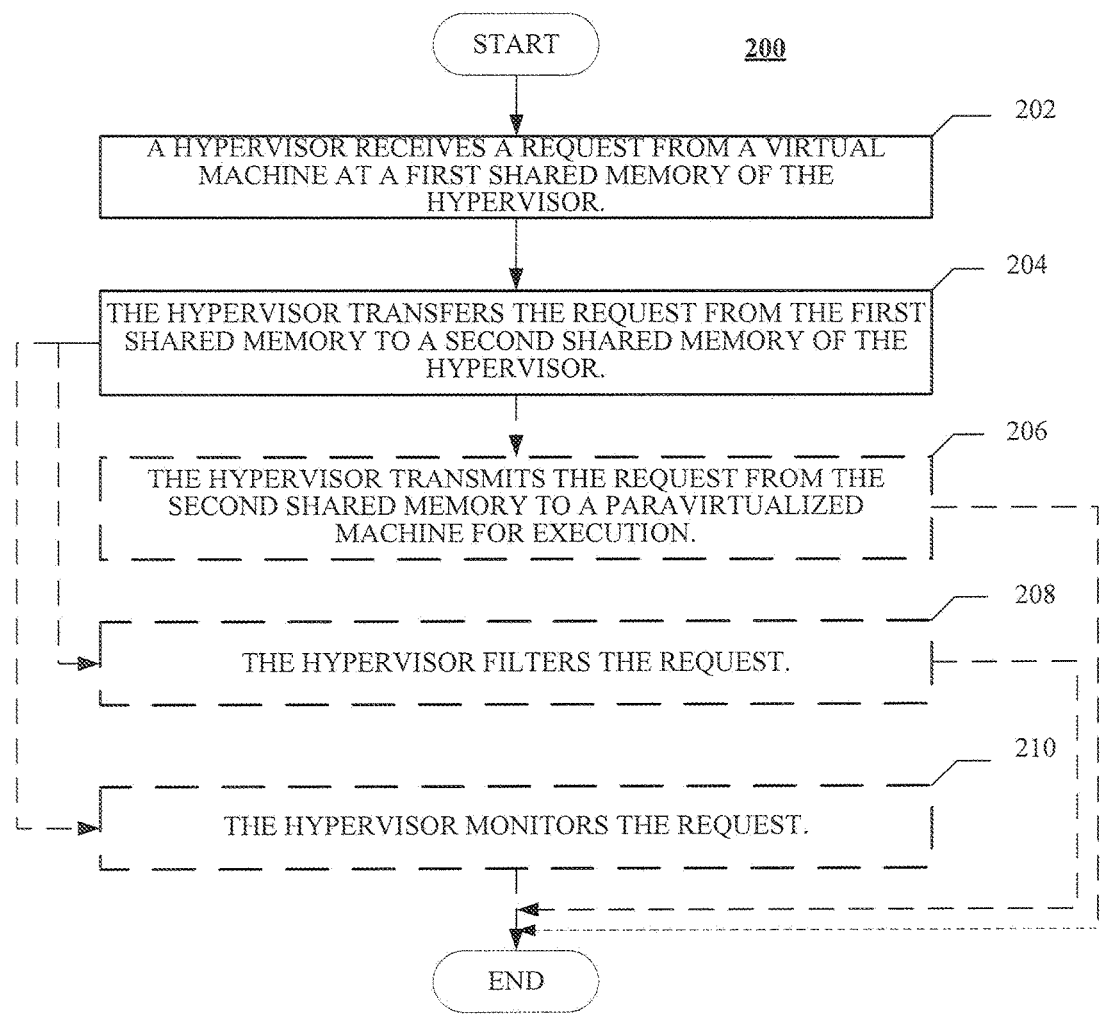
FIG. 2 is a flow diagram illustrating one embodiment of a method for executing a request between a virtual machine and a paravirtualized machine of a host operating system.

FIG. 2 is a flow diagram illustrating one embodiment of a method 200 for executing a request between a virtual machine and a paravirtualized machine of a host operating system. Method 200 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof. In one embodiment, method 200 is performed primarily by the memory manager 114 of the hypervisor 112 of the HM of FIG. 1.

Referring now to FIGS. 1 and 2, at block 202, the hypervisor 112 receives a request from the virtual machine 120 and the hypervisor 112 stores the request in the shared memory 118 accessible to the VM 120 but not the paravirtualized machine 126. At block 204, the hypervisor 112 transfers the request from the shared memory 118 to the shared memory 116 accessible to the paravirtualized machine 126 but not the virtual machine 120, where the request stored in the shared memory 116 is intended for execution by the paravirtualized machine 126. Whether the request is wholly transferred unaltered between the shared memories 116, 118 depends on several factors.

In one embodiment, the transfer is performed without modification of the request. In such circumstances, at block 206, the hypervisor 112 transmits the request from the shared memory 116 to the paravirtualized machine 126 where the request is executed by the paravirtualized machine 126 by modifying the state of a device 110, the memory 111, or writing/reading a packet to/from the network 150 (e.g., the device driver 128 executes code for operating on a device 111 (e.g., writing a word to a register of DEV 2)).

In one embodiment, the transfer is performed with a modification of the request. In such circumstances, at block 208, the hypervisor 112 performs a filtering operation on the request. This filtering operation may include dropping of the request entirely by not transferring the request to the shared memory 116, or altering the request before transferring it to the shared memory 116. Filtering operations may be based on, but are not limited to, the source of the request, the destination of the request, the length of the request, the type of request, or a specification of a device associated with the request. Examples of each are as follows:

The source of the request—a source address associated with the request may be verified to match one assigned to a guest (i.e., a VM 120) by the hypervisor 112. In another example, only requests originating from a specific port may be permitted.

The destination of the request—for example, a guest (i.e., a VM 120) may be permitted to access only specific addresses. In another example, only requests with a specific destination port may be permitted.

The length of the request—the request size may be verified not to exceed the host mtu.

The type of request—requests originating outside a local LAN may be limited to dns requests, or broadcast requests may be limited to arp requests.

A specification of a device associated with the request—privileged access may be allowed only from a specific privileged device.

In one embodiment, the transfer is performed without a modification of the request but, at block 210, the hypervisor 112 monitors the request to identify one or more predefined parameters. Any of the above parameters used for filtering a request may be applied to monitoring the request. In an embodiment, a monitoring operation performed on a request may result in one or more notification messages sent to either the guest operating system 124 of the VM 120 or the host operating system 104 (e.g., notifying the guest operating system 124 of a modification of a state of a device 110 or of the filtering of a request (e.g., a dropped packet or a denial of carrying out the request for security reasons)).

Figure 3:
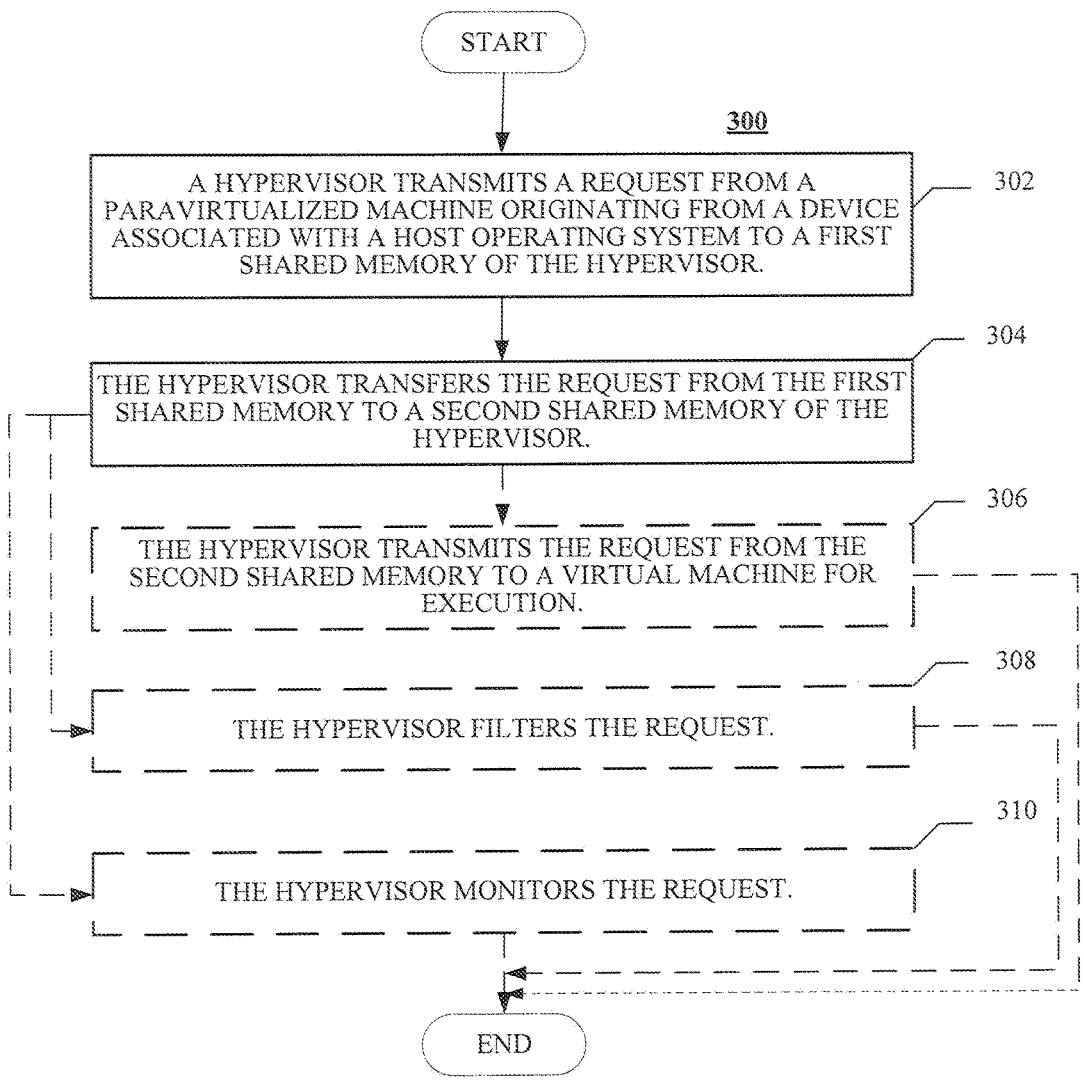
FIG. 3 is a flow diagram illustrating one embodiment of a method for executing a request between a device associated with the host operating system and a virtual machine of the guest operating system via a paravirtualized machine.

FIG. 3 is a flow diagram illustrating one embodiment of a method 300 for executing a request between a device 110 associated with the host operating system 104 and a virtual machine 120 of the guest operating system 124 via the paravirtualized machine 126. Method 300 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof. In one embodiment, method 300 is performed primarily by the memory manager 114 of the hypervisor 112 of the HM of FIG. 1.

Referring now to FIGS. 1 and 3, at block 302, the hypervisor 112 transmits a request from the paravirtualized machine 126 originating from a device 111 associated with the host operating system 104 to the shared memory 116. At block 304, the hypervisor 120 transfers the request from the shared memory 116 to the shared memory 118, where the request stored in the shared memory 118 is intended for execution by the virtual machine 120. Whether the request is wholly transferred unaltered between the shared memories 116, 118 depends on several factors.

In one embodiment, the transfer is performed without modification of the request. In such circumstances, at block 306, the hypervisor 112 transmits the request from the shared memory 118 to the VM 120 for execution by the guest operating system 124.

In one embodiment, the transfer is performed with a modification of the request. In such circumstances, at block 308, the hypervisor 112 performs a filtering operation on the request. This filtering operation may include dropping of the request entirely by not transferring the request to the shared memory 118, or altering the request before transferring it to the shared memory 118. Filtering operations may be based on, but are not limited to, the source of the request, the destination of the request, the length of the request, the type of request, or a specification of a device associated with the request.

In one embodiment, the transfer is performed without a modification of the request but, at block 310, the hypervisor 112 monitors the request. Any of the above parameters used for filtering a request may be applied to monitoring the request. In an embodiment, a monitoring operation performed on a request may be accompanied by one or more notification messages sent to either the guest operating system 124 of the VM 120 or the host operating system 104 (e.g., notifying the guest operating system 124 or a user (not shown) of a modification of a state of a device 110).

Figure 4:
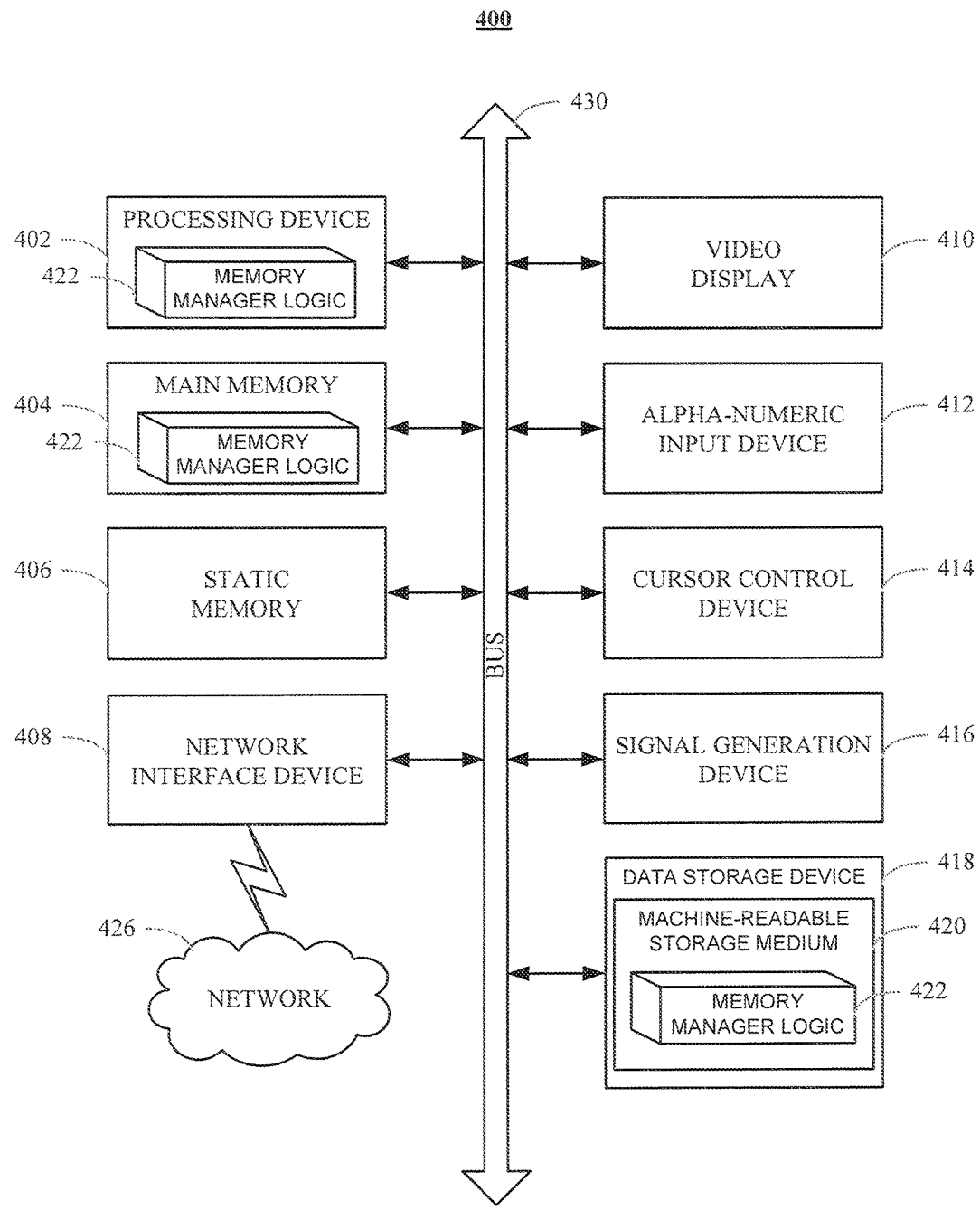
FIG. 4 illustrates a diagrammatic representation of a machine in the exemplary form of a computer system within which a set of instructions, for causing the machine to perform any one or more of the methodologies discussed herein, may be executed.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute device queue manager logic 422 for performing the operations and steps discussed herein.

Computer system 400 may further include a network interface device 408. Computer system 300 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., device queue manager logic 422) embodying any one or more of the methodologies of functions described herein (e.g., DQ manager 116 of FIG. 1). Device queue manager logic 422 may also reside, completely or at least partially, within main memory 404 and/or within processing device 402 during execution thereof by computer system 400; main memory 404 and processing device 402 also constituting machine-readable storage media. Device queue manager logic 422 may further be transmitted or received over a network 426 via network interface device 408.

Machine-readable storage medium 420 may also be used to store the device queue manager logic persistently. While machine-readable storage medium 420 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self—consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
providing, by a hypervisor executed by a processing device of a host system, a first memory location shared between a virtual machine executed by the processing device and the hypervisor for exclusive use by the virtual machine;
providing, by the hypervisor, a second memory location shared between a paravirtualized machine executed by processing device and the hypervisor for exclusive use by the paravirtualized machine, wherein the paravirtualized machine is assigned a first level of privileges, and wherein the virtual machine is assigned a second level of privileges that is lower than the first level of privileges assigned to the paravirtualized machine;
receiving a request from the virtual machine at the first memory location, wherein the request is to be executed by the paravirtualized machine, wherein the first memory location is accessible to the virtual machine but not to the paravirtualized machine, wherein the request from the virtual machine is received from an application of the virtual machine, and wherein a corresponding request from the paravirtualized machine is received from the processing device of the host system that is executing the virtual machine;
in response to a length of the request exceeding a maximum transmission size of the host system executing the virtual machine, determining to not transfer the request from the first memory location to the second memory location and providing a notification to a guest operating system associated with the virtual machine in view of the determination to not transfer the request; and
in response to the length of the request not exceeding the maximum transmission size of the host system executing the virtual machine, transferring, by the hypervisor, the request from the first memory location to the second memory location when the request from the first memory location, the second memory location accessible to the paravirtualized machine but not to the virtual machine.

2. The method of claim 1, wherein the transferring is performed without modification of the request.

3. The method of claim 1, further comprising executing the request by the paravirtualized machine.

4. The method of claim 3, wherein said executing the request comprises modifying a state of a device associated with a host operating system of a host computer system.

5. The method of claim 4, wherein modifying the state of the device comprises modifying a location in memory associated with the host operating system.

6. The method of claim 4, wherein modifying the state of the device comprises at least one of transmitting a packet to a network device or receiving a packet from a network device.

7. The method of claim 4, further comprising notifying the guest operating system of the modification of the state of the device.

8. The method of claim 1, further comprising filtering the request, the filtering comprising dropping the request.

9. The method of claim 8, wherein the filtering is in view of at least one of a source of the request, a destination of the request, a length of the request, a type of the request, or a specification of a device associated with the request.

10. The method of claim 1, wherein determining to not transfer the request from the first memory location to the second memory location is further in response to a source address of the request not matching a corresponding source address that has been assigned to the virtual machine.

11. The method of claim 1, further comprising dropping, if necessary, the request in view of a source address associated with the request, a specific destination port of the request, the length of the request exceeding a host maximum transmission unit (MTU), a type of the request, and a privilege of a device associated with the request, wherein the type of request comprises domain name system (DNS) and address resolution protocol (ARP).

12. A method comprising:
providing, by a hypervisor executed by a processing device of a host system, a first memory location shared between a paravirtualized machine executed by the processing device and the hypervisor for exclusive use by the paravirtualized machine;
providing, by the hypervisor, a second memory location shared between a virtual machine executed by a host computer system and the hypervisor for exclusive use by the virtual machine, wherein the paravirtualized machine is assigned a first level of privileges, and wherein the virtual machine is assigned a second level of privileges that is lower than the first level of privileges assigned to the paravirtualized machine;
transmitting, by the paravirtualized machine, a request to the first memory location, wherein the request is from the processing device associated with a host operating system and is to be executed by the virtual machine, wherein the first memory location is accessible to the paravirtualized machine but not to the virtual machine, wherein the request transmitted from the paravirtualized machine is received from the processing device associated with the host operating system that is executing the virtual machine, and wherein a corresponding request from the virtual machine is received from an application of the virtual machine;
in response to a length of the request exceeding a maximum transmission size of the host system executing the paravirtualized machine, determining to not transfer the request from the first memory location to the second memory location and providing a notification to a guest operating system associated with the paravirtualized machine in view of the determination to not transfer the request; and
in response to the length of the request not exceeding the maximum transmission size of the host system executing the paravirtualized machine, transferring, by the hypervisor, the request from the first memory location to the second memory location, the second memory location accessible to the virtual machine but not to the paravirtualized machine.

13. The method of claim 12, wherein the transferring is performed without modification of the request.

14. The method of claim 13, further comprising executing the request by the virtual machine.

15. The method of claim 12, further comprising filtering the request.

16. The method of claim 12, further comprising monitoring the request.

17. The method of claim 12, further comprising notifying the guest operating system of a modification of a state of the device.

18. A system, comprising:
a memory; and
a processing device, operatively coupled with the memory, to:
provide, by a hypervisor executed by the processing device of a host system, a first memory location shared between a virtual machine executed by the processing device and the hypervisor for exclusive use by the virtual machine;
provide, by the hypervisor executed by the processing device, a second memory location shared between a paravirtualized machine executed by the processing device and the hypervisor for exclusive use by the paravirtualized machine, wherein the paravirtualized machine is assigned a first level of privileges, and wherein the virtual machine is assigned a second level of privileges that is lower than the first level of privileges assigned to the paravirtualized machine;
receiving, by the hypervisor executed by the processing device, a request from the virtual machine at the first memory location, wherein the request is to be executed by the paravirtualized machine, wherein the first memory location is accessible to the virtual machine but not to the paravirtualized machine, wherein the request from the virtual machine is received from an application of the virtual machine, and wherein a corresponding request from the paravirtualized machine is received from the processing device of the host system that is executing the virtual machine;
alter, by the hypervisor executed by the processing device, the request in view of a type of the request;
in response to a length of the altered request exceeding a maximum transmission size of the host system executing the virtual machine, determining to not transfer the request from the first memory location to the second memory location and providing a notification to a guest operating system associated with the virtual machine in view of the determination to not transfer the request; and
in response to the length of the altered request not exceeding the maximum transmission size of the host system executing the virtual machine, transfer, by the hypervisor, the request from the first memory location to the second memory location, the second memory location accessible to the paravirtualized machine but not to the virtual machine.

19. The system of claim 18, wherein the hypervisor executed by the processing device is further to filter the request in view of a specification of a device associated with the request.

20. The system of claim 18, wherein the hypervisor executed by the processing device is further to monitor the request.

21. The system of claim 18, wherein the hypervisor executed by the processing device is further to notify a guest operating system of a modification of a state of a device.

22. A non-transitory computer readable storage medium comprising instructions that, when executed by a processing device, cause the processing device to:
provide, by a hypervisor executed by the processing device of a host system, a first memory location shared between a paravirtualized machine executed by the processing device and the hypervisor for exclusive use by the paravirtualized machine;
provide, by the hypervisor, a second memory location shared between a virtual machine executed by the processing device and the hypervisor for exclusive use by the virtual machine, wherein the paravirtualized machine is assigned a first level of privileges, and wherein the virtual machine is assigned a second level of privileges that is lower than the first level of privileges assigned to the paravirtualized machine;
transmit, by the paravirtualized machine, a request to the first memory location, wherein the request is from the processing device associated with a host operating system of the processing device and is to be executed by the virtual machine, wherein the first memory location is accessible to the paravirtualized machine but not to the virtual machine, wherein the request transmitted from the paravirtualized machine is received from the processing device associated with the host operating system that is executing the virtual machine, and wherein a corresponding request from the virtual machine is received from an application of the virtual machine;
in response to a length of the request exceeding a maximum transmission size of the host system executing the paravirtualized machine, determining to not transfer the request from the first memory location to the second memory location and providing a notification to a guest operating system associated with the paravirtualized machine in view of the determination to not transfer the request; and
in response to the length of the request not exceeding the maximum transmission size of the host system executing the paravirtualized machine, transfer, by the hypervisor, the request from the first memory location to the second memory location, the second memory location accessible to the virtual machine but not to the paravirtualized machine.

23. The non-transitory computer readable storage medium of claim 22, wherein the hypervisor executed by the processing device is further to transfer the request without modification of the request.

* * * * *